United States Patent
Barron et al.

(10) Patent No.: US 7,831,353 B1
(45) Date of Patent: Nov. 9, 2010

(54) VEHICLE CONTROL SYSTEM AND METHOD OF CONTROLLING A VEHICLE SYSTEM

(75) Inventors: Richard J. Barron, Ann Arbor, MI (US); Kenneth A Doll, Ann Arbor, MI (US); Stephen J. Green, Clarkston, MI (US)

(73) Assignees: TRW Automotive U.S. LLC, Livonia, MI (US); Kelsey-Hayes Company, Livonia, MI (US)

( * ) Notice: Subject to any disclaimer, the term of this patent is extended or adjusted under 35 U.S.C. 154(b) by 895 days.

(21) Appl. No.: 11/524,699

(22) Filed: Sep. 21, 2006

(51) Int. Cl.
  *B60G 17/018* (2006.01)
  *B60G 17/019* (2006.01)
  *B60G 17/005* (2006.01)
(52) U.S. Cl. ..................... 701/37; 280/5.512
(58) Field of Classification Search ............. 701/37–44; 280/5.51–5.512
  See application file for complete search history.

(56) References Cited

U.S. PATENT DOCUMENTS

| | | | | |
|---|---|---|---|---|
| 4,616,846 A | * | 10/1986 | Furuya et al. ............ 280/5.516 |
| 4,669,749 A | * | 6/1987 | Tanaka et al. .............. 280/5.51 |
| 4,691,284 A | * | 9/1987 | Izumi et al. .................... 701/38 |
| 4,797,823 A | * | 1/1989 | Ikemoto et al. ............... 701/38 |
| 4,848,791 A | * | 7/1989 | Bridges ................. 280/93.501 |
| 4,882,693 A | * | 11/1989 | Yopp ........................... 701/37 |
| 5,204,815 A | * | 4/1993 | Yamamoto ................... 701/38 |
| 5,276,621 A | * | 1/1994 | Henry et al. .................. 701/37 |
| 5,321,616 A | * | 6/1994 | Okuda et al. .................. 701/37 |
| 5,379,222 A | * | 1/1995 | Anan et al. .................... 701/91 |
| 5,444,621 A | * | 8/1995 | Matsunaga et al. ............ 701/37 |
| 5,483,446 A | * | 1/1996 | Momose et al. ................ 701/1 |
| 5,519,611 A | * | 5/1996 | Tagawa et al. ................ 701/37 |
| 5,691,899 A | * | 11/1997 | Terasaki ....................... 701/38 |
| 5,697,634 A | * | 12/1997 | Kamimae et al. ..... 280/124.108 |
| 6,219,604 B1 | * | 4/2001 | Dilger et al. .................. 701/41 |
| 6,247,685 B1 | * | 6/2001 | Takahashi .............. 267/140.15 |
| 7,092,808 B2 | * | 8/2006 | Lu et al. ....................... 701/70 |
| 2004/0199314 A1 | * | 10/2004 | Meyers et al. ................. 701/38 |

FOREIGN PATENT DOCUMENTS

JP  59038107 A  *  3/1984
JP  02003510 A  *  1/1990

* cited by examiner

*Primary Examiner*—Mark Hellner
*Assistant Examiner*—Ari M Diacou
(74) *Attorney, Agent, or Firm*—MacMillan, Sobanski & Todd, LLC

(57) ABSTRACT

A vehicle control system includes a steering mechanism adapted to be operatively connected to associated wheels of a vehicle. A position sensor is operatively connected to the steering mechanism to generate a signal representative of a position of the steering mechanism. A filter device receives the steering position signal and generates a filtered output. The electronic control unit is operable to generate a control signal based at least in part upon the filtered steering position signal. A vehicle control subsystem is in communication with the electronic control unit and is responsive to the control signal. A vehicle system is controlled by monitoring the position of a steering mechanism of a vehicle, determining a rate of change of the position of the steering mechanism, filtering the rate of change, comparing the filtered rate of change to a threshold value, and controlling a vehicle system based upon the comparison.

12 Claims, 4 Drawing Sheets

VEHICLE CONTROL SYSTEM AND METHOD OF CONTROLLING A VEHICLE SYSTEM

BACKGROUND OF THE INVENTION

This invention relates in general to vehicle control systems and methods of controlling vehicle systems.

Generally, vehicles include a variety of base systems, such as, for example, engine/powertrain, brake, steering, suspension, etc. Most vehicles include advanced systems that control one or more components of the base systems to perform auxiliary functions. These advanced systems may include, for example, antilock braking systems (ABS), slip control systems (SCS), traction control (TC), roll control (RC), vehicle stability control (VSC), enhanced stability control (ESC), advanced suspension control (SUSP).

Typically, these advanced systems are controlled by a programmed electronic control unit (ECU). The electronic control unit utilizes information from various vehicle sensors that measure dynamic characteristics of the movement of a vehicle, such as acceleration, yaw rate, pitch rate, roll rate, steering angle, vehicle braking action, vehicle drive train operation, and the like, to control operation of various components of the vehicle, for example, to improve handling or safety. Examples of components that may be controlled by one of the advanced systems are suspension actuators, engine/powertrain transmission, steering actuators, vehicle brakes and other like or known similar components.

BRIEF SUMMARY OF THE INVENTION

This invention relates in particular to a vehicle control system and a method of controlling vehicle systems utilizing a steering signal.

In one embodiment, a vehicle control system includes a vehicular steering mechanism adapted to be operatively connected to associated wheels of a vehicle. A steering position sensor is operatively connected to the steering mechanism to generate a signal representative of a position of the vehicle steering mechanism. A filter device receives the steering position signal and generates a filtered output. An electronic control unit (ECU) is in communication with the steering position sensor. The electronic control unit is operable to generate a control signal based at least in part upon the filtered steering position signal. A vehicle control subsystem is in communication with the electronic control unit. The vehicle control subsystem is responsive to the control signal.

In another embodiment, a vehicle system is controlled by monitoring the position of a steering mechanism of a vehicle, determining a rate of change of the position of the steering mechanism, filtering the rate of change, comparing the filtered rate of change to a threshold value, and controlling a vehicle system based upon the comparison.

Other advantages of this invention will become apparent to those skilled in the art from the following detailed description, when read in light of the accompanying drawings.

DETAILED DESCRIPTION OF THE INVENTION

Figure 1:
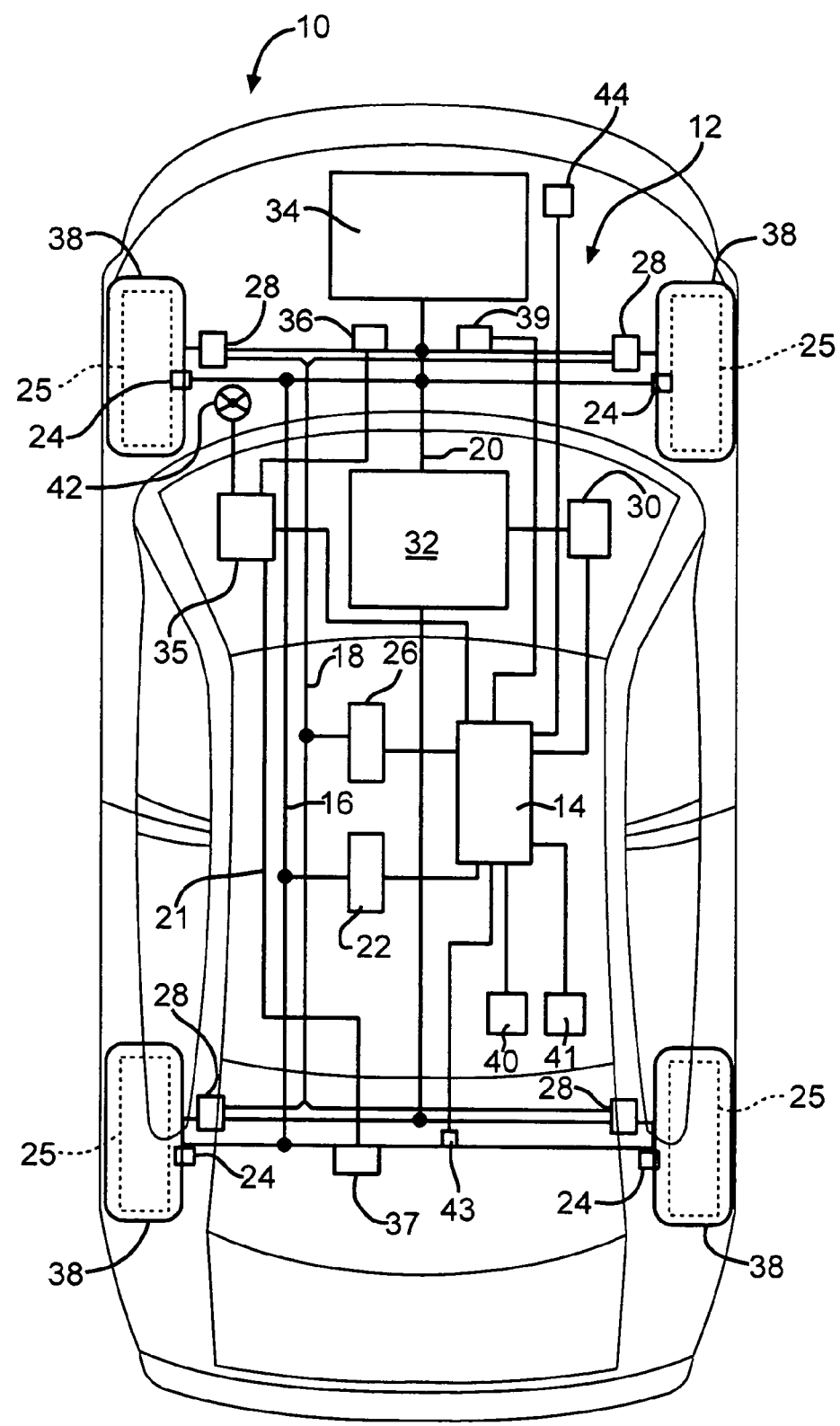
FIG. 1 is a schematic diagram of an embodiment of a vehicle having a vehicle control system.

Referring now to the drawings, there is illustrated in FIG. 1 a vehicle, indicated generally at 10, having a vehicle control system, indicated generally at 12. The vehicle control system 12 includes an electronic control unit 14 (ECU). The vehicle control system 12 also includes a plurality of vehicle control subsystems. The plurality of vehicle control subsystems includes components of the vehicle 10 that affect the operation of the vehicle 10. In the illustrated embodiment, the electronic control unit 14 of the vehicle control system 12 is operative to generate one or more output signals to one or more vehicle control subsystems in order to cause the vehicle control subsystem(s) to act to improve vehicle stability and/or performance.

As shown in the embodiment illustrated in FIG. 1 the plurality of vehicle control subsystems may include a vehicle braking system 16, a vehicle suspension system 18, a vehicle powertrain system 20, and a vehicle steering system 21. It must be understood, however, that the plurality of vehicle control subsystems need not include any particular vehicle system and indeed may be any suitable vehicle system or systems for controlling the operation of a vehicle, such as the vehicle 10. The particular vehicle systems to be included in the plurality of vehicle control subsystems may, for example, be chosen based upon the application of a particular vehicle in which the vehicle control system 12 is to be included. Alternatively, the particular arrangement(s) and/or type(s) of vehicle control subsystems may be other than illustrated and described, if so desired.

In the illustrated embodiment, the vehicle braking system 16 includes an electronic brake controller 22 and a plurality of wheel brakes 24 for braking associated wheels 25 of the vehicle 10. A respective tire 38 is mounted upon each wheel 25. The vehicle braking system 16 may be a hydraulic/pneumatic braking system with fluid pressure actuated wheel brakes. The vehicle braking system 16 may be an electromechanical braking system, such as brake-by-wire, with electric driven wheel brakes. Alternatively, the particular vehicle braking system may be other than illustrated and desired, and may be any system operable to provide vehicle braking as so desired.

In the illustrated embodiment, upon receipt of a signal or an activation command from the electronic control unit 14, such as initiated by depression of a brake pedal or instruction from another vehicle subsystem, the electronic brake controller 22 actuates the wheel brakes 24. This may be accomplished by supplying electric current, in the case of electric wheel brakes, or fluid pressure, in the case of hydraulic or pneumatic brakes, or in any other suitable manner as desired. It must be understood that the operation of the vehicle braking system 16 may be preformed in any suitable manner, including antilock braking, or alternatively in any manner desired that is operable to brake the vehicle 10.

In the illustrated embodiment, the vehicle suspension system 18 is operable to isolate portions of the vehicle 10 from loads imposed by irregularities in the terrain over which the vehicle 10 travels. The vehicle suspension system 18 is also operable to isolate portions of the vehicle 10 from loads imposed by movements of other portions of the vehicle 10. The vehicle suspension system 18 includes an electronic suspension controller 26 and a plurality of suspension actuators 28. The condition of at least one component of the vehicle suspension system 18 may be modified or selected so as to improve stability of the vehicle 10. For example, the condition, i.e., the lock/unlock state of the suspension actuators 28, may be selected to change the "stiffness" properties of a anti-roll bar (not shown) of the vehicle 10. Additionally, the condition of other suspension components (not shown) may be modified to improve the stability of the vehicle 10. For example, the condition, i.e., opened or closed flow state of control valves or other components (not shown) may be modified to change fluid flow characteristics in such components as hydraulic or pneumatic shock absorbers, or to vary the fluid pressure in pneumatic or hydraulic suspension bags. Additionally, electrical components may be modified to change the electrical field supplied to suspension components containing suitable fluids, like electro-rheological fluids, or even the state of tire pressure valve may be modified to vary the air pressure in associated vehicle tires. It must be understood that the electronic suspension controller 26 may modify any suitable vehicle system or subsystem as desired for improving the stability of the vehicle 10 and/or for modifying the ride or handing of the vehicle 10.

In the illustrated embodiment, the vehicle powertrain system 20 includes an electronic transmission controller 30 and a power transmission unit 32 operatively connected to an engine 34 of the vehicle 10. The power transmission unit 32 is effective to transfer power to and distribute power among the wheels 25 of the vehicle 10. The power transmission unit 32 is operable to transfer the power from the engine 34 at a variety of different ratios to the wheels 25. For example, the power transmission unit 32 may include a conventional arraignment of gears, such as a three, four or five speed geared transmission, with reverse capabilities. Alternatively, the power transmission unit 32 may be a continuously variable transmission (CVT), or any other mechanism operable to transmit power from the engine 34 to the wheels 25. The electronic transmission controller 30 is operable to control the power output ratio of the power transmission unit 32. For example, the electronic control unit 14 may calculate a desirable power ratio. Such a calculation may be based on a desired engine efficiency, a desired amount of torque, or any other desired result. In the illustrated embodiment, the electronic control unit 14 is operative to transmit a control signal to the electronic transmission controller 30 indicating the desired power output ratio and the electronic transmission controller 30 is operative to generate a control signal to the power transmission unit 32.

In the illustrated embodiment, the vehicle steering system 21 includes a steering controller 35 for controlling a front steering actuator 36 and a rear steering actuator 37. The front steering actuator 36 controls the angle or alignment of the front wheels 25 relative to the body or chassis of the vehicle 10 and the rear steering actuator 37 controls the angle or alignment of the rear wheels 25 relative to the body of the vehicle 10. For example, the steering controller 35 receives an input signal representative of a desired change in the angle or alignment for the wheels 25. The input signal maybe generated by a driver interface device 42, e.g. steering wheel, or by the electronic control unit 14, or by any device operable to indicate a desired change in the angle of the wheels 25. The steering controller 35 is then operative to control the angle the wheels 25. While the vehicle 10 has been described in the preferred embodiment as a vehicle having front and rear wheel steering, it must be understood that the system and method described may be utilized in conjunction with a vehicle with only front or rear wheel steering, as desired.

In the illustrated embodiment, the electronic control unit 14 is in communication with a front steering angle sensor 39 and a rear steering angle sensor 43 to receive a pair of signals representative of the steering angle or position of at least one component of the steering system, such as the front and rear wheels 25, the steering wheel 42, a pinion (not shown), a rack (not shown), shaft (not shown), gear (not shown), or any other suitable steering component. It must be understood that the electronic control unit 14 may be in direct or indirect, wired or wireless communication with the front steering angle sensor 39 and the rear steering angle sensor 43. In the illustrated embodiment, the electronic control unit 14 is preferably operative to control the plurality of vehicle control subsystems, namely ABS, SCS, TC, RC, VSC, ESC and SUSP, based at least in part upon at least one of the pair of steering angle signals received by the electronic control unit 14 from the front steering angle sensor 39 and the rear steering angle sensor 43.

In the illustrated embodiment, the vehicle control system 12 may also include a plurality of other sensors configured to detect a variety of vehicle conditions. For example, the plurality of other sensors may include a vehicle lateral acceleration sensor 40, a vehicle speed sensor 41, a vehicle yaw rate sensor (not shown), speed sensors for individual wheels (not shown), a vehicle longitudinal acceleration sensor (not shown), or any other sensor suitable to detect a desired operating condition of the vehicle 10. These sensors are all in communication with the electronic control unit 14 in order to provide signals representative of a variety of vehicle dynamics. The electronic control unit 14 is programmed to control the plurality of vehicle control subsystems, namely ABS, SCS, TC, RC, VSC, ESC and SUSP, based at least in part upon the vehicle condition data received by the electronic control unit 14 from the plurality of sensors Further, the position of obstacles on the road and/or the position of other vehicles on the road may be detected through advanced sensors, such as, for example, a vehicular radar system 44. It may be desirable to modify control of one or more of the vehicle control subsystems controlled by the electronic control unit 14 based on a predetermined anticipated need to effect maneuvering or controlling the vehicle in order to avoid a collision with such obstacles and/or other vehicles.

In the illustrated embodiment, the front steering angle sensor 39, the rear steering angle sensor 44, the vehicle lateral acceleration sensor 40, and the vehicle speed sensor 41 are shown in FIG. 1 as preferably being in direct communication, e.g. "hard wired", with the electronic control unit 14. It must be understood, however, that the vehicle control system 12 may optionally includes one or more suitable mechanisms, e.g., a relay or a transceiver, which are operative to receive the vehicle condition data from one or more of the plurality of sensors and re-transmit the vehicle condition data to the electronic control unit 14. For example, the mechanism may be a hard-wired data relay, a wireless data transceiver, or any other suitable device for communicating the vehicle condition data from the sensors to the electronic control unit 14. Alternatively, any of the plurality of sensors and the electronic control unit 14 may connected by other suitable direct wireless communication, e.g. peer to peer, or indirect wireless communication, e.g. networked, if so desired.

Figure 2:
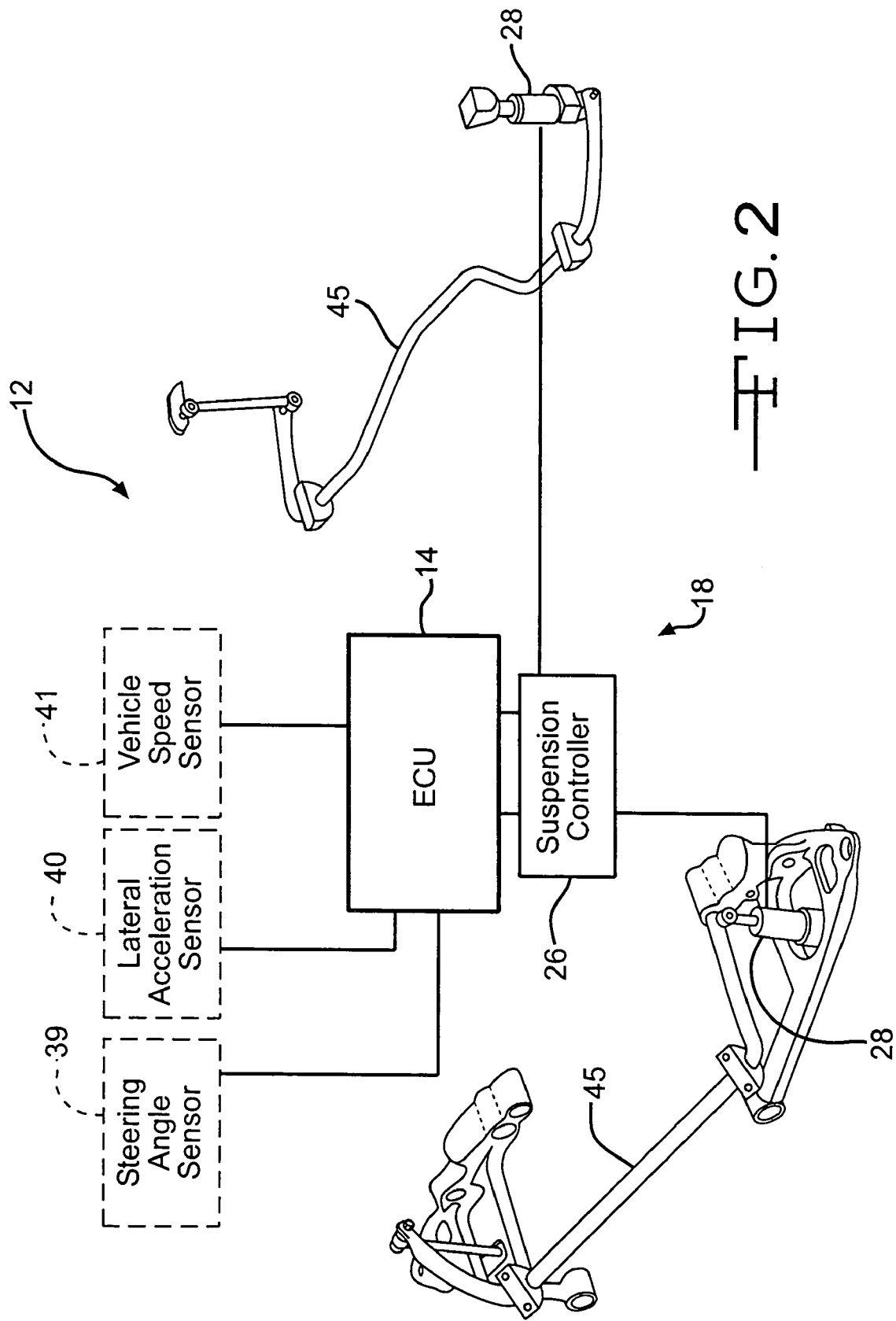
FIG. 2 is a representative illustration of a portion of the vehicle of FIG. 1.

For example, as shown in FIG. 2, an embodiment of the vehicle control system 12 will now be described with regards to a particular vehicle control subsystem, such as vehicle stability control (VSC), and will be described with regards to only a front wheel steering system. In the following description of the front steering angle sensor 39 will be described as operative to provide an analog signal representative of the position of the steering wheel 42. It must be understood, however, that this signal may be analog, digital or in any other suitable format. Additionally, the signal may be representative of the position of any desired steering mechanism component. With regards to the analog steering position signal, in the following description the amplitude of the signal (relative deviation from a zero setting) will correlate to the displacement, e.g. angular off set, from the default, e.g. straight or forwardly aligned, position with a positive value representing change in one direction, e.g. a right and turn, and a negative value representing displacement in another direction, e.g. left hand turn. The frequency or slope of the signal will correlate to the rate of change of the steering mechanism, e.g. the steering wheel 42. Thus, an average rate of change may be determined by analyzing the frequency of a particular signal sample and an instantaneous rate of change may be determined by analyzing the slope of a graphical representation of the signal sample at a particular point.

As shown therein FIG. 2, the front steering angle sensor 39, the vehicle lateral acceleration sensor 40, and the vehicle speed sensor 41 are operative to provide input signals to the electronic control unit 14. The electronic control unit 14 is operative to generate an output control signal based upon the input signals to the suspension controller 26. In turn, the suspension controller 26 is operative to selectively lock and unlock the suspension actuators 28. As shown, an anti-roll bar or anti-sway bar 45 is associated with each pair of the front and rear wheels 25. The suspension actuators 28 are operable to selectively lock and unlock the anti-roll bars, with one suspension actuator 28 being associated with each of the pair of wheels 25. Based upon the control signal generated by the electronic control unit 14, the suspension controller 26 selectively controls the vehicle suspension system 18 of the vehicle 10. However, it must be understood that while the electronic control unit 14 and the suspension controller 26 are illustrated as being separate components which are operatively coupled together, the electronic control unit 14 and the suspension controller 26 may be formed integrally as a single unit, or the electronic control unit 14 and the suspension controller 26 may be any one unit operable to perform the functions of the electronic control unit 14 and the suspension controller 26. Additionally, while this example is described with regards to VCS and the vehicle control system 12, it must be understood that the invention contemplates and includes embodiments relating to other vehicle systems and subsystems, such as, for example, including but not limited to, ABS, SCS, TC, RC, ESC, SUSP.

Figure 3:
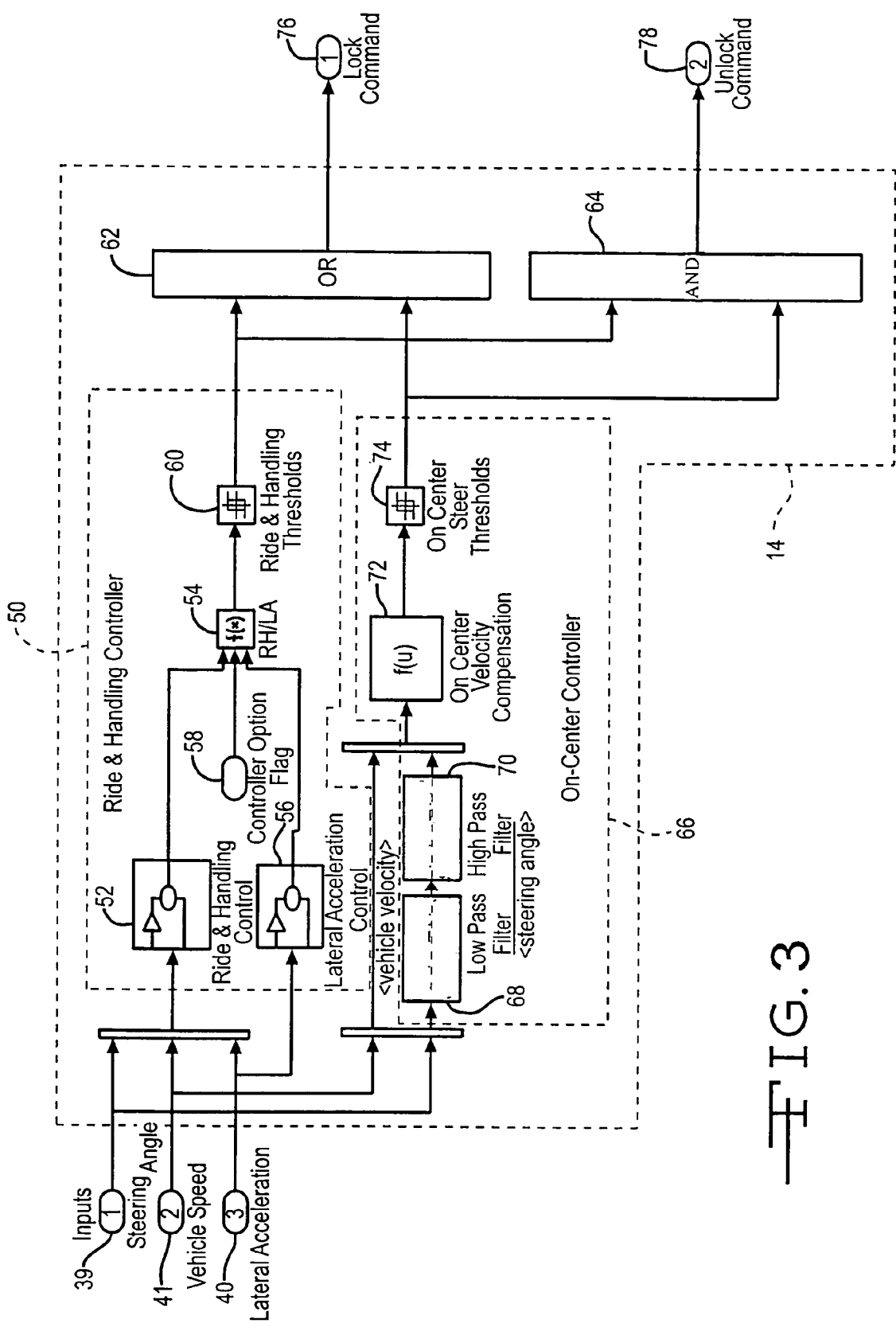
FIG. 3 is an embodiment of a logic circuit diagram of the electronic control unit of the vehicle shown in FIG. 2.

There is shown in FIG. 3 a representation of an embodiment of program logic of the electronic control unit 14 shown in FIG. 2. While the program logic is illustrated as a circuit diagram, it must be understood that the programming of the electronic control unit 14 may be accomplished by hard wired components, or by the creation of virtual components by programming a microprocessor computer system integrated into the electronic control unit 14, or by any other arrangement suitable to provide the program logic for the electronic control unit 14.

As shown in the embodiment illustrated in FIG. 3, the electronic control unit 14 includes a ride and handling controller 50. In the illustrated embodiment, the ride and handling controller 50 includes a ride and handling processor 52 that accepts input signals form the steering angle sensor 39, the vehicle lateral acceleration sensor 40, and the vehicle speed sensor 41. The ride and handling processor 52 generates an output signal or ride and handling state value to a Ride and Handling/Lateral Acceleration (RH/LA) comparator processor 54 based upon the input signals provided by the sensors 39, 40, and 41.

In the illustrated embodiment, the ride and handling controller 50 includes a lateral acceleration processor 56 that receives an input signal form the vehicle lateral acceleration sensor 40. The lateral acceleration processor 56 generates an output signal or a lateral acceleration state value to the RH/LA processor 54 based upon the input signal provided by the sensor 40.

An option controller 58 is provided and is operable to indicate to the RH/LA processor 54 the priority of the input signals from the ride and handling processor 52 and the lateral acceleration processor 56. For example, it may be desirable in one vehicle mode, e.g. luxury mode, to give preference to ride and handling control. In another mode, e.g. sport mode, it may be desirable to give preference to lateral acceleration control. In the example of the illustrated embodiment of FIG. 3, the state of the option controller 58 may be determined by programming the driving mode of the vehicle. The control option flag 58 would then indicate to the RH/LA processor 54 the priority of the inputs form the ride and handling processor 52 and the lateral acceleration processor 56.

The RH/LA processor 54 generates an output signal based upon the state of the option controller 58 and the inputs from the ride and handling processor 52 and the lateral acceleration processor 56 to a ride and handling threshold processor 60. Based upon the output signal generated by the RH/LA processor 54 and predetermined threshold values, the ride and handling threshold processor 60 indicates to a lock gate 62 that the suspension actuators 28 should be locked or indicates to an unlock gate 64 that the suspension actuators 28 should be unlocked.

As further shown in the embodiment illustrated in FIG. 3, the electronic control unit 14 includes an on-center controller 66. The on-center controller 66 includes a low pass filter 68 that accepts an input signal from the steering angle sensor 39. The low pass filter 68 is operative to eliminate noise in the signal received from the front steering angle sensor 39 above a certain predetermined level. The low pass filter 68 is operable to eliminate high frequency signal changes due, for example, to small corrections made by the driver in straight ahead driving or small variations in the steering angle due to "play" in the steering system. The low pass filter 68 generates a "filtered" output signal to a high pass filter 70. The high pass filter 70 is operative to eliminate noise in the signal received from the low pass filter 68 below a certain predetermined level. The high pass filter 70 is operable to eliminate low frequency signal changes due, for example, to gradual slow turn maneuvers made by the driver in driving with relatively gently curves or gradual compensation for misalignment in the steering angle. In the illustrated embodiment, the high pass filter 70 generates a "filtered" output to an on-center velocity processor 72. The on-center velocity processor 72 also accepts an input signal form the vehicle speed sensor 41. Alternatively, the arrangement of the low pass filter 68 and the high pass filter 70 may be other than illustrated if so desired.

The on-center velocity processor 72 generates an output signal based upon the input signals from the low pass filter 68 and the high pass filter 70 and the vehicle speed sensor 41 to an on-center steer threshold processor 74. Based upon the input signal from on-center velocity processor 72 and predetermined threshold values, the on-center steer threshold processor 74 indicates to the lock gate 62 that the suspension actuators 28 should be locked or indicates to the unlock gate 64 that the suspension actuators 28 should be unlocked.

In the illustrated embodiment of FIG. 3, if either the ride and handling threshold processor 60 or the on-center steer threshold processor 74 indicates to the lock gate 62 that the suspension actuators 28 should be locked, then a lock command signal 76 is transmitted to the suspension actuators 28. If both the ride and handling threshold processor 60 and the on-center steer threshold processor 74 indicate to the unlock gate 64 that the suspension actuators 28 should be unlocked, then an unlock command 78 is transmitted to the suspension actuators 28.

Thus, in this embodiment a method for controlling a vehicle system is provided in which the position, e.g. angle or linear displacement of a steering mechanism, e.g. steering wheel, pinion, rack, shaft, gear, or vehicle wheel is monitored, a rate of change of the position of the steering mechanism is determined, the rate of change is filtered, the filtered rate of change is compared to a threshold value, and a vehicle system is controlled based upon the comparison. In one aspect, this method includes an algorithm that can distinguish between small noise type motions of a vehicle steering wheel [mechanism] that may occur in straight ahead driving, and minor corrections a driver makes to adjust the vehicle's heading or position within a lane based only on steering wheel input. The algorithm thresholds and filters can be modified based on other parameters, such as vehicle speed. The algorithm may be utilized for controlling Semi-Active Roll Control (SARC) or other vehicle systems, such as Electronic Power Assisted Steering (EPAS).

Figure 4:
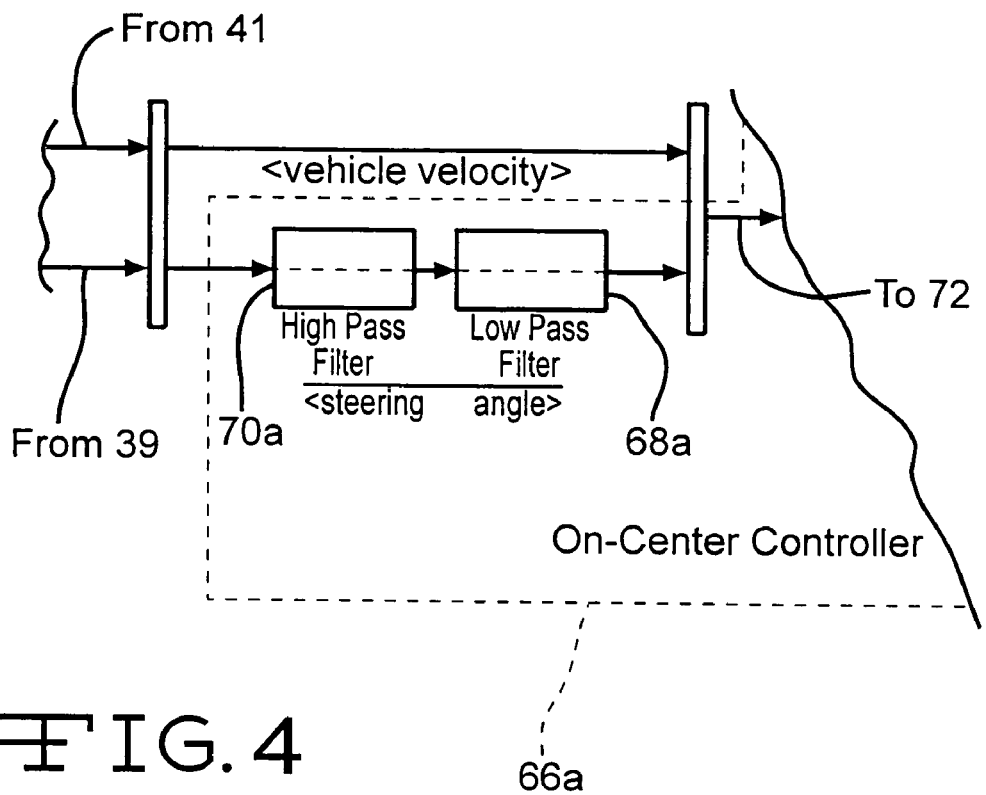
FIG. 4 is an alternate embodiment of a portion of a logic circuit diagram of FIG. 3.

Turning now to FIG. 4 and using like reference numbers to indicate corresponding parts, there is illustrated a portion of an alternate embodiment of the logic circuit diagram shown in FIG. 3. In this embodiment, an on-center controller 66a receives an input signal from the steering angle sensor 39 which is then first supplied to a high pass filter 70a and then to a low pass filter 68a.

Figure 5:
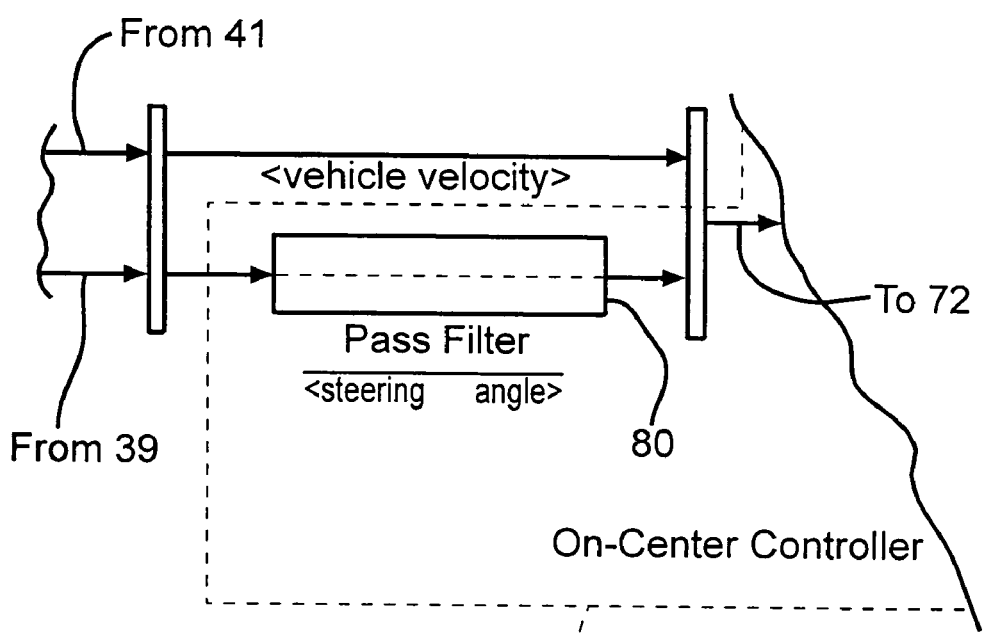
FIG. 5 is another alternate embodiment of a portion of the logic circuit diagram of FIG. 3.

Turning now to FIG. 5 and using like reference numbers to indicate corresponding parts, there is illustrated a portion of another alternate embodiment of the logic circuit diagram shown in FIG. 3. In this embodiment, an on-center controller 66b receives an input signal from the steering angle sensor 39 which is then supplied to a single pass filter 80. The single pass filer 80 may allow the passage of any desired frequency range. It must be understood that the on-center controller(s) 66, 66a, and 66ba may include any number or type of filters operable to filter one or both of the steering angle signals from the associated sensors 39 and 43.

While the principle and mode of operation of this invention have been explained and illustrated with regard to its various illustrated embodiments, it must be understood, however, that this invention may be practiced otherwise than as specifically explained and illustrated without departing from its spirit or scope.

What is claimed is:

1. A vehicle control system comprising:
   a vehicular steering mechanism adapted to be operatively connected to associated wheels of a vehicle;
   at least one steering position sensor operatively connected to said steering mechanism for generating a steering position signal representative of a position of said steering mechanism;
   an on-center controller having a filter device which receives said steering position signal, filters said steering position signal to eliminate at least one of noise and low frequency changes in said steering position signal, and then generates a filtered output signal;
   an electronic control unit in communication with said on-center controller, said electronic control unit operative to generate a control signal based at least in part upon said filtered output signal; and
   a vehicle suspension system having at least one selectively lockable suspension actuator, said at least one selectively lockable suspension actuator being selectively controlled by said control signal generated by said electronic control unit;
   wherein said on-center controller further includes an on-center velocity processor which receives said filtered output signal and a signal received from a vehicle speed sensor and generates an output signal, whereby said electronic control unit is operative to generate said control signal, based at least in part upon said output signal received from said on-center velocity processor, to said at least one selectively lockable suspension actuator of said suspension system.

2. The vehicle control system of claim 1 wherein said filter device includes at least one of a low pass filter and a high pass filter.

3. The vehicle control system of claim 1 wherein said filter device includes a single pass filter.

4. The vehicle control system of claim 1 wherein said filter device includes both a low pass filter and a high pass filter.

5. The vehicle control system of claim 4 wherein said low pass filter receives said steering position signal, generates a low filter filtered output signal to said high pass filter, and said high pass filter generates said filtered output signal which is used by said electronic control unit to generate said control signal to said at least one selectively lockable suspension actuator of said suspension system.

6. The vehicle control system of claim 1 wherein said filter device enables said on-center controller to distinguish between small noise type motions that occur in straight ahead driving and minor corrections a driver makes to adjust a vehicle's heading or position within a lane.

7. A vehicle control system comprising:
   a vehicular steering mechanism adapted to be operatively connected to associated wheels of a vehicle;
   at least one steering position sensor operatively connected to said steering mechanism for generating a steering position signal representative of a position of said steering mechanism;
   an on-center controller having a filter device which receives said steering position signal, filters said steering position signal to eliminate at least one of noise and low frequency changes in said steering position signal, and then generates a filtered output signal;
   an electronic control unit in communication with said on-center controller, said electronic control unit operative to generate a control signal based at least in part upon said filtered output signal;
   a vehicle suspension system having at least one selectively lockable suspension actuator, said at least one selectively lockable suspension actuator being selectively controlled by said control signal generated by said electronic control unit; and
   further including a ride and handling controller which receives said steering position signal and generates a ride and handling state output signal to said electronic control unit, whereby said electronic control unit is operative to generate a control signal, based at least in part upon said filtered output signal and said ride and handling state output signal, to said at least one selectively lockable suspension actuator of said suspension system.

8. The vehicle control system of claim 7 wherein said ride and handling controller further receives a signal from at least one of a vehicle lateral acceleration sensor and a vehicle speed sensor.

9. The vehicle control system of claim 7 wherein said filter device includes a single pass filter.

10. The vehicle control system of claim 7 wherein said filter device includes at least one of a low pass filter and a high pass filter.

11. The vehicle control system of claim 7 wherein said filter device includes both a low pass filter and a high pass filter.

12. The vehicle control system of claim 11 wherein said low pass filter receives said steering position signal, generates a low filter filtered output signal to said high pass filter, and said high pass filter generates said filtered output signal which is used by said electronic control unit to generate said control signal to said at least one selectively lockable suspension actuator of said suspension system.

* * * * *